Feb. 10, 1970             E. EGLI             3,494,214

LINK CHAIN FOR TRANSMITTING A MECHANICAL LOAD

Filed Aug. 27, 1968             2 Sheets-Sheet 1

INVENTOR.
EMIL EGLI
BY
*Woodbury, Blanchard & Flynn*
ATTORNEYS

INVENTOR.
EMIL EGLI

# United States Patent Office 3,494,214
Patented Feb. 10, 1970

3,494,214
LINK CHAIN FOR TRANSMITTING A
MECHANICAL LOAD
Emil Egli, Schulstrasse 5, Windisch, Switzerland
Filed Aug. 27, 1968, Ser. No. 755,591
Claims priority, application Switzerland, Sept. 12, 1967,
12,744/67
Int. Cl. F16g *13/10*
U.S. Cl. 74—246         7 Claims

ABSTRACT OF THE DISCLOSURE

A link chain for transmitting a mechanical load to or from a sprocket or other complementary device, said chain having a plurality of links, each of which has a pair of end portions with outer surfaces defining parts of spheres and connected by a bar. Hollow spherically shaped drive elements have a pair of diametrically aligned openings for loosely receiving the links. The outer surfaces of a pair of end portions of two adjacent links engage the interior spherical walls of each drive element to provide a universal joint so that the chain can bend around said sprocket. Each drive element has two similar cup-shaped portions joined together.

---

This invention relates to a link chain for transmitting a mechanical load to a sprocket, said chain comprising a plurality of dumbbell-shaped links and a corresponding number of hollow spherically shaped drive elements, each of which is engaged by the enlarge end portions of two adjacent links.

Link chains of presently known structures are generally limited to use with coplanar sprockets for transmitting a mechanical load between the sprockets by the chain. Furthermore, transport chains are known in which the chain elements are arranged so that they are flexible interchangeably in two different planes. However, this solution for transmitting a mechanical load with directions of movement in different planes is only possible where relatively large bending radii and slow speeds are involved. By this, mechanical loads can be directed in various planes of movement without any slippage. However, the transmittable forces are thereby very small because they are limited by the continuous loading capacity of the plastic string used in such chains.

The basic purpose of the present invention is to avoid the deficiencies of the above-mentioned known devices for transmitting a mechanical load and to construct a link chain of the mentioned type in such a way that it meets the requirements of the industry by being capable of transferring great loads or torsional moments at high linear or rotational speeds with simultaneous uniform and universal flexibility.

The link chain according to the invention is characterized in that each hollow spherical drive element comprises two cup-shaped portions which are joined together at a parting plane, and have substantially concentric spherical inner surfaces. The end portions of the links, which end portions engage said drive elements, are provided with outer surfaces which define parts of spheres and uniformly engage the inner surfaces of the hollow spherical drive elements to allow a universal movement of successive links about the centerpoint of the hollow spherical drive elements coupling same.

The chain link is used in a device for transmitting a mechanical load in such a way that said chain link loops around a part of the peripheral portion of at least one rotatable sprocket and the sprocket is provided with recesses which are equally spaced at its periphery, said recesses each receiving one drive element.

Further characteristics and details of the invention are disclosed in the following description and in the drawings in which, purely as an example, some embodiments and examples of use of the link chain of the invention are illustrated.

Figure 1:
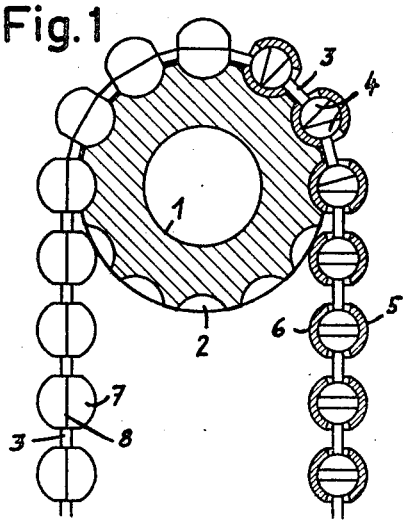
FIGURE 1 illustrates a partially sectioned link chain cooperating with a sprocket.

Referring to FIGURE 1, a link chain of the type embodying the invention is composed of plural dumbbell-shaped links 3, each having end portions 4 interconnected by a bar and engaged with hollow spherically shaped drive elements 7 for engaging the circumference of a sprocket 1. The circumference of said sprocket 1 is provided with a plurality of equally spaced recesses 2 each of which receives a portion of the peripheral surface of one drive element 7 of the link chain. The recesses 2 of the sprocket 1 are preferably spherically shaped so that adequate surface contact is created with the engaging drive elements 7.

As can be seen from FIGURES 3 to 6, each hollow spherical drive element 7 comprises two cup portions 5 and 6 which abut at a parting surface 8. Each drive element encloses a pair of preferably cup-shaped end portions 4, each of which has an outer surface defining a part of a spherical surface less than a hemisphere. The bars preferably attach near the midpoints of the outer surfaces of said end portions. A pair of axially aligned openings 9 are provided in each hollow spherically shaped drive element 7 and each opening 9 has a truncated cone-shaped peripheral contour diverging radially outwardly for pivotal reception of a bar.

Figure 2:
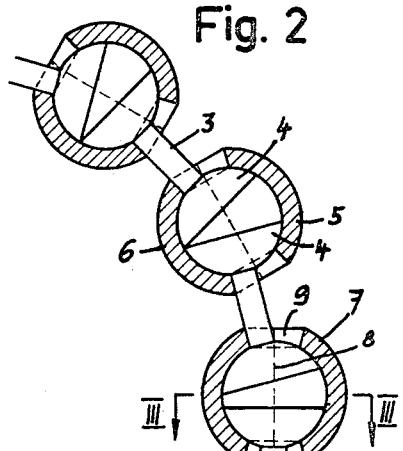
FIGURE 2 is an enlarged showing of a portion of the link chain of FIGURE 1.
Figure 3:
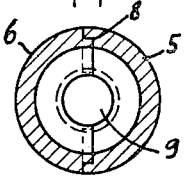
FIGURE 3 is a cross-sectional view along the line III—III of FIGURE 2.
Figure 4:
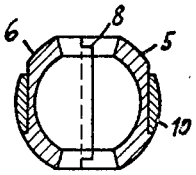
FIGURES 4, 5 and 6 illustrate various embodiments of the hollow spherically shaped drive elements.

In order to assemble concentrically the two cup portions 5 and 6 of a drive element 7 and, at the same time prevent relative movement between them, the cup portions 5 and 6 have interlocking tongues and grooves 8 in their meeting surfaces which lock the two portions 5 and 6 together and prevent a relative movement therebetween in the plane of the meeting line. The two cup portions 5 and 6 are connected together to form a hollow spherically shaped drive element 7, each element being engaged on the interior thereof by the enlarged end portions 4 of two adjacent links (FIGURE 2), after which the cup portions are held together by a shrunk or press-fit ring 10, such as is illustrated in FIGURE 4. In this embodiment, the outer surface of the ring 10 has the same radius and spherical shape as the outer surface of the spherically shaped element it engages.

Figure 5:
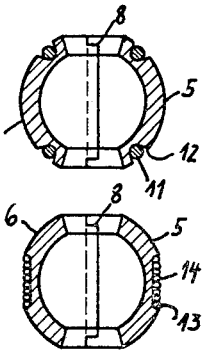

FIGURE 5 discloses a second embodiment illustrating the provision of two retaining rings 11 for connecting the two cup portions 5 and 6 together, said retaining rings being received in peripheral grooves 12 concentric with and adjacent to the openings 9.

Figure 6:
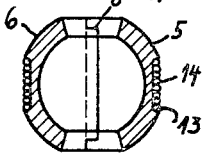

A further embodiment is illustrated in FIGURE 6 and discloses an annular spring element, here a coil spring 14, recessed in a groove 13 for holding the cup portions 5 and 6 together. The engaging surfaces of the cup portions 5 and 6 can be connected by welding, soldering, gluing or the like, if desired.

The spherically shaped end portions 4 of the links 3 are preferably integral with their connecting bars and the end portions engage the interior surface of the hollow spherical drive elements 7. That is, the end portions 4 are each provided with a spherically shaped surface having a radius equal to the radius of the interior surface of an element so that they will uniformly contact the inner surface of the hollow spherically shaped drive element. Moreover, the diameter of openings 9 is substantially larger than that of the link bars. Thus, a universal movement of successive links 3 about the centerpoint of the hollow spherically shaped drive elements 7 is made possible. Furthermore, the applied forces on the spherical joints which occur during transmission of mechanical loads are distributed uniformly over a large area.

Figures 9, 10:
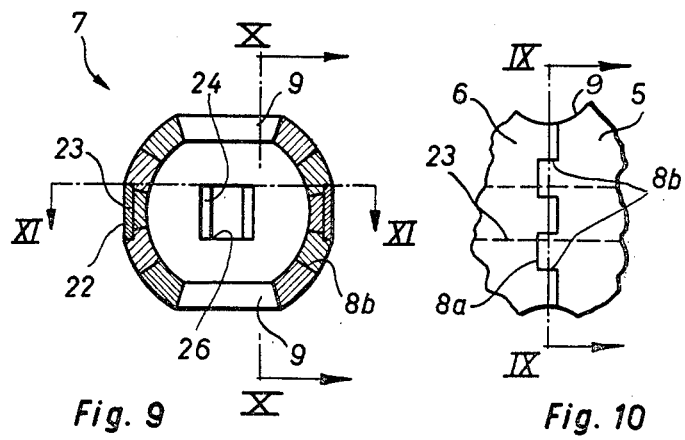
FIGURE 9 is a longitudinal secition view of a further embodiment of a hollow, spherically shaped drive element taken along the line IX—IX of FIGURE 10.
FIGURE 10 is a fragmentary, section view taken along the line X—X of FIGURE 9.
Figure 11:
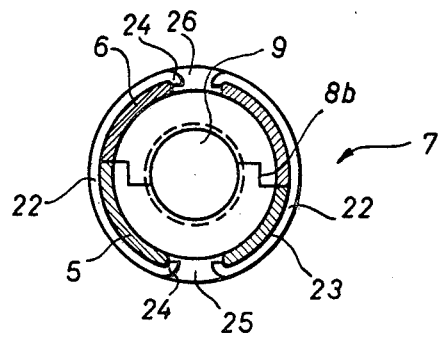
FIGURE 11 is a sectional view taken along the line XI—XI of FIGURE 9.

A preferred embodiment for connecting the two cup portions 5 and 6 together to form a drive element 7 is illustrated in FIGURES 9 to 11. Both cup portions 5 and 6 have the same structure and have a portion provided with teeth 8a. The toothed portions on both cups 5 and 6 join together and engage one another without leaving any gaps therebetween. The edges 8b of the teeth are positioned in planes which intersect in a common spherical axis. Thus, the two cup portions 5 and 6 are fixed with respect to each other and relative movement in the engaged plane is prevented. Two clip springs 22 are provided for connecting the cup portions together. The clip springs are recessed in a great circle groove 23 along both united cup portions 5 and 6, said groove being positioned perpendicularly to the parting plane between the two cups. Each of the clip springs 22 is arc shaped and has two claw-shaped end portions 24 (FIGURE 11), one of said end portions engaging a recess 25 in the one cup portion 5 and the other one of said end portions engaging a recess 26 in the other cup portion 6.

The embodiment illustrated in FIGURES 9 to 11 is particularly advantageous if the cup portions 5 and 6 are molded from a polymeric plastic since both cup portions 5 and 6 of one drive element can be manufactured by the same die. The dumbbell-shaped links 3 are advantageously made of metal since the bar connecting the two end portions has a relatively small cross section and is exposed to substantial tensile stress. By choosing this material, in addition to the advantages of the finishing technique, a noiseless running of the link chain is obtained. Furthermore, in general, lubricating means are not needed.

Figure 7:
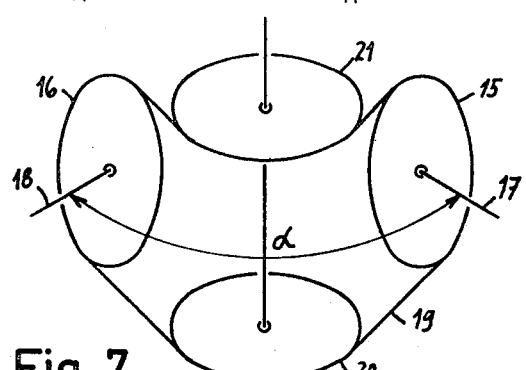
FIGURES 7 and 8 are schematic perspective views of two examples of the intended use of link chain and sprocket assemblies.
Figure 8:
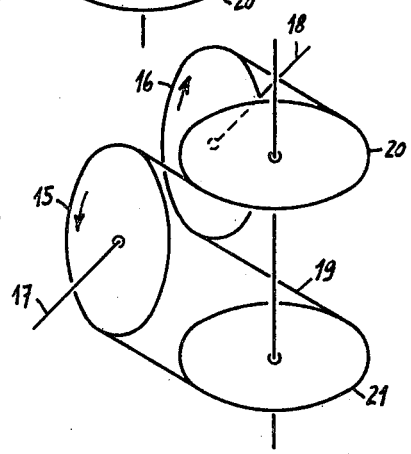

The example of usage of the link chain as illustrated in FIGURE 7 shows an apparatus in which the axes of the shafts 17 and 18 intersect at a point and define an angle $x$. Sprockets 15 and 16 are rotatably supported on shafts 17 and 18. The link chain 19 is guided over two independently rotatable idler sprockets 20 and 21 for transmitting the rotation of shaft 17 to shaft 18. FIGURE 8 illustrates another example of usage, namely, axially aligned sprockets in which the aligned or parallel shafts 17 and 18 rotate in opposite directions.

The embodiments of the invention in which an exclusive property or privilege is claimed are defined as follows:

1. A link chain for transmitting a mechanical load to or from a sprocket comprising:
   a plurality of dumbbell-shaped links, each link having a pair of end portions with surfaces facing one another and bar means connected therebetween;
   each of said surfaces defining part of a sphere smaller than a hemisphere, the end portions and bar means of each link being in axial alignment and substantially symmetrical with respect to their common axis;
   a plurality of hollow drive elements having spherical interior and exterior surfaces, each element having two similar cup-shaped portions joined together along meeting surfaces substantially defining a diametrical plane, the cup-shaped portions forming the drive element being held together by at least one ring intersecting said plane; and
   a pair of axially aligned openings in each element, the axis of said pair being substantially in said plane, and the diameter of each opening being substantially larger than the diameter of said bar means, each element containing a pair of the end portions of two adjacent links and said surfaces of said end portions being snugly and slideably engageable with the interior surface of an element to allow a universal movement of adjacent links about the centerpoint of the hollow drive element coupling same.

2. The link chain defined in claim 1, wherein said cup-shaped portions of each hollow drive element have engaging means in the meeting surfaces thereof which concentrically fix said two cup-shaped portions with respect to each other and prevent relative movement in said plane.

3. The link chain defined in claim 2, wherein the engaging means are interlocking tongues and grooves.

4. The link chain defined in claim 3, wherein the cup-shaped portions are identical and the engaging means are joined together without gaps therebetween.

5. The link chain defined in claim 1, wherein the ring comprises at least one annular spring element which is seated in a peripheral groove intersecting said plane.

6. The link chain defined in claim 1, wherein the links are made of metal and the cup-shaped portions are made of a polymeric plastic having a self-lubricating characteristic.

7. A link chain for transmitting a mechanical load to or from a sprocket comprising:
   a plurality of dumbbell-shaped links, each link having a pair of end portions with surfaces facing one another and bar means connected therebetween;
   each of said surfaces defining part of a sphere smaller than a hemisphere, the end portions and bar means of each link being in axial alignment and substantially symmetrical with respect to their common axis;
   a plurality of hollow drive elements having spherical interior and exterior surfaces, each element having two similar cup-shaped portions joined together along meeting surfaces substantially defining a diametrical plane;
   the cup-shaped portions forming the drive element being connected by two semicircular clamping springs which are recessed in a groove intersecting said plane, each clamping spring having two claw-shaped end portions, one of which engages a first recess along said groove in the first cup-shaped portion and the other one of which engages a second recess along said groove in the first cup-shaped portion and
   a pair of axially aligned openings in each element, the axis of said pair being substantially in said plane, and the diameter of each opening being substantially larger than the diameter of said bar means, each element containing a pair of the end portions of two adjacent links and said surfaces of said end portions being snugly and slideably engageable with the interior surface of an element to allow a universal movement of adjacent links about the centerpoint of the hollow drive element coupling same.

References Cited

UNITED STATES PATENTS

| | | | |
|---|---|---|---|
| 267,665 | 11/1882 | Brayton | 74—246 |
| 1,233,534 | 7/1917 | Wirtz. | |
| 1,270,143 | 6/1918 | Gagnon | 59—78 |
| 1,327,925 | 1/1920 | Schneider. | |
| 2,714,269 | 8/1955 | Charles | 59—80 |

JAMES A. WONG, Primary Examiner

U.S. Cl. X.R.

59—78

UNITED STATES PATENT OFFICE

CERTIFICATE OF CORRECTION

Patent No. 3 494 214　　　　　　　　　Dated February 10, 1970

EMIL EGLI

It is certified that error appears in the above-identified patent and that said Letters Patent are hereby corrected as shown below:

Column 4, line 66; "alon gsaid" should read ---along said---.

Column 4, line 68; "first cup-shaped" should read ---second cup-shaped---.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents